(12) United States Patent
Contarino

(10) Patent No.: US 7,857,333 B2
(45) Date of Patent: Dec. 28, 2010

(54) VEHICLE SUSPENSION STABILISING ARRANGEMENT

(75) Inventor: Aldo Contarino, Woodvale (AU)

(73) Assignee: AV International Corporation, Tortola (VG)

( * ) Notice: Subject to any disclaimer, the term of this patent is extended or adjusted under 35 U.S.C. 154(b) by 815 days.

(21) Appl. No.: 10/484,504

(22) PCT Filed: Jul. 26, 2002

(86) PCT No.: PCT/AU02/01000

§ 371 (c)(1),
(2), (4) Date: Jul. 2, 2004

(87) PCT Pub. No.: WO03/010015

PCT Pub. Date: Feb. 6, 2003

(65) Prior Publication Data

US 2004/0232644 A1    Nov. 25, 2004

(30) Foreign Application Priority Data

Jul. 26, 2001  (AU) ................................. PR6639

(51) Int. Cl.
  *B60G 5/00* (2006.01)
  *B62K 25/04* (2006.01)
(52) U.S. Cl. .................. 280/124.111; 280/87.042; 280/80.1; 280/281.1; 280/124.117
(58) Field of Classification Search ........... 280/87.041, 280/80.1, 124.1, 124.11, 124.116, 124.111, 280/87.042, 281.1, 124.117; 305/132
See application file for complete search history.

(56) References Cited

U.S. PATENT DOCUMENTS 1,725,817 A  *  8/1929  Mitchell ..................... 305/132

(Continued)

FOREIGN PATENT DOCUMENTS

DE         19952230 A1      5/2001

(Continued)

OTHER PUBLICATIONS

Office Action in corresponding Japanese application No. 2003-515391 dated Jul. 8, 2008.

*Primary Examiner*—Paul N. Dickson
*Assistant Examiner*—George D. Spisich
(74) *Attorney, Agent, or Firm*—Rothwell, Figg, Ernst & Manbeck, P.C.

(57) ABSTRACT

A stabilizing arrangement (100) characterized by a mounting member (32), at least one forward truck (34) supporting a forward pair of surface engaging members (36), and at least one rear truck (38) supporting a rear pair of surface engaging members (40), each truck (34, 38) allowing biased rotation about a central axis thereof, the forward truck (34) being mounted on the mounting member (32) such that it projects forwardly thereof and the rear truck (38) being mounted on the mounting member (32) such that it projects rearwardly thereof, and whereby the mounting member (32) is supported substantially between the trucks (34, 38) and pairs of surface engaging members (36, 40). A suspension and steering arrangement is also provided.

14 Claims, 10 Drawing Sheets

U.S. PATENT DOCUMENTS

| | | | | |
|---|---|---|---|---|
| 2,509,324 A * | 5/1950 | Van Horn | ................ | 280/11.28 |
| 4,054,297 A | 10/1977 | Solimine | | |
| 4,521,029 A | 6/1985 | Mayes | | |
| 4,804,205 A | 2/1989 | Parsons | | |
| 5,655,615 A | 8/1997 | Mick | | |
| 5,794,955 A * | 8/1998 | Flynn | ................ | 280/87.042 |
| 5,975,229 A * | 11/1999 | Hosoda | ................ | 180/181 |
| 5,997,018 A * | 12/1999 | Lee | ................ | 280/87.042 |
| 6,279,930 B1 * | 8/2001 | Chang et al. | ................ | 280/87.042 |
| 6,293,560 B1 * | 9/2001 | Byatt | ................ | 280/5.2 |
| 6,520,517 B1 * | 2/2003 | Chung et al. | ................ | 280/87.042 |
| 6,669,215 B2 * | 12/2003 | Laporte | ................ | 280/87.042 |
| 6,805,368 B1 * | 10/2004 | Chen | ................ | 280/87.041 |
| 7,121,566 B2 * | 10/2006 | McClain | ................ | 280/87.042 |
| 7,287,928 B2 * | 10/2007 | Chen | ................ | 403/162 |
| 7,303,199 B2 * | 12/2007 | Chen | ................ | 280/87.041 |
| 7,374,179 B2 * | 5/2008 | Cole | ................ | 280/11.27 |
| 2002/0084602 A1 | 7/2002 | Feng | | |
| 2003/0141689 A1 * | 7/2003 | Hamy | ................ | 280/87.042 |

FOREIGN PATENT DOCUMENTS

| | | |
|---|---|---|
| EP | 558776 A1 | 4/1993 |
| EP | 0 558 776 A1 | 9/1993 |
| EP | 1 028 049 A2 | 8/2000 |
| FR | 2564411 | 5/1985 |
| FR | 2 730 418 A1 | 8/1996 |
| GB | 2 063 784 A | 6/1981 |
| JP | S43-883 | 1/1943 |
| JP | 62153193 | 9/1987 |
| JP | 63501207 | 5/1988 |
| JP | 11033159 | 2/1999 |
| JP | 11197289 | 7/1999 |
| JP | 200061024 | 2/2000 |
| RU | 2060047 C1 | 5/1996 |
| WO | WO 98/57839 A1 | 12/1998 |

\* cited by examiner

VEHICLE SUSPENSION STABILISING ARRANGEMENT

This application is a §371 of PCT Application Serial No. PCT/AU02/01000, filed Jul. 26, 2002.

FIELD OF THE INVENTION

The present invention relates to a stablising arrangement.

The stabilising arrangement of the present invention has application as a suspension and steering arrangement for a vehicle. Further, the suspension and steering arrangement of the present invention is intended for use in providing both substantially smooth transition over uneven terrain and a tight turning circle without sliding for the vehicle or conveyance on which it is provided. It is envisaged that the suspension arrangement of the present invention is particularly suitable for use on bicycles and motorcycles but is not to be limited thereto.

The stabilising arrangement of the present invention further has application as a surface engaging member or foot for use is stabilising any number of items, including machinery and heavy equipment, on any surface, although most advantageously on uneven surfaces.

BACKGROUND ART

Previously, attempts have made to provide either a gliding or skating sensation when utilising a bicycle or similar vehicle or conveyance. In this regard reference may be had to U.S. Pat. No. 4,863,182, Australian Patent Application 32359/89 and British Patent Application 2122557. Each of these documents discloses a bicycle-like conveyance on which the front-wheel, forks and handle bars have been replaced by a single pair of small wheels, for example skateboard wheels, mounted transversely on a single axle. Such an arrangement requires the rider to steer entirely by shifting their body weight which in turn acts on a truck supporting the axle of the pair of small wheels. Such an arrangement is difficult to operate and is often dangerous.

The dangerous nature of prior art arrangements is accentuated through the use of the small pair of wheels, as the small wheels are unable to ride over even small obstacles. As a result, a rider encountering an obstacle at speed may be thrown forward in a dangerous manner.

A suspension arrangement that goes some way towards overcoming the above problems is disclosed in International Patent Publication WO 98/57839. This document describes a suspension arrangement for a wheeled conveyance characterised by a mounting member under which is provided two pairs of wheels, each pair being mounted on a skateboard-type truck. As the trucks are, mounted directly under the mounting member the wheels and trucks operate much as they would on a skateboard. An additional biasing means is provided which acts to bias the forward pair of the two pairs of wheels upwardly so that obstacles may be mounted safely if the rider pulls upwardly on the handlebars, if the suspension arrangement is fitted to a bicycle, thereby "kicking-up" the front pair of wheels to help in the mounting of the obstacle.

Unfortunately, the suspension arrangement of WO98/839 has been found not to maintain the "footprint" of the pairs of wheels when undergoing tight turns, such that one of each pair of wheels has a tendency to lift off the ground thereby often causing the wheels remaining in contact with the ground to skid sideways. Such a circumstance can be dangerous for the rider of the conveyance.

In the field of heavy machinery, for example cranes and digging equipment, it is often necessary to stabilise that equipment through the use of hydraulic rams mounted to the sides thereof. These rams are often mounted on extendable arms to spread load and increase stability. The rams further have a ground engaging member or foot pivotally mounted to a lower end thereof. The pivotal mounting is intended to allow some adaptation to the form of the surface on which the equipment is to be supported. However, the provision of a mounting that is pivotal about only a single axis often does not allow sufficiently stable location of the foot on the surface, particularly on undulating, loose or sloping surfaces.

The suspension and steering arrangement of the present invention has as one object thereof to overcome substantially the above problems of the prior art, or to at least provide a useful alternative thereto.

The preceding discussion of the background art is intended to facilitate an understanding of the present invention only. It should be appreciated that the discussion is not an acknowledgement or admission that any of the material referred to was part of the common general knowledge in Australia as at the priority date of the application.

Throughout the specification, unless the context requires otherwise, the word "comprise" or variations such as "comprises" or "comprising", will be understood to imply the inclusion of a stated integer or group of integers but not the exclusion of any other integer or group of integers.

DISCLOSURE OF THE INVENTION

In accordance with the present invention there is provided a stabilising arrangement characterised by a mounting member, at least one forward truck supporting a forward pair of surface engaging members, and at least one rear truck supporting a rear pair of surface engaging members, each truck allowing biased rotation about a central axis thereof, the forward truck being mounted on the mounting member such that it projects forwardly thereof and the rear truck being mounted on the mounting member such that it projects rearwardly thereof, the central axis of rotation of each truck being aligned with a longitudinal axis of the mounting member, the mounting member being supported substantially between the trucks and pairs of surface engaging member, whereby rotation of the mounting member about its longitudinal axis is compensated for.

Preferably, the mounting of the trucks to the mounting member is such that the central axis of rotation of at least one of the trucks is inclined from the horizontal as defined by the mounting member. Both trucks are preferably inclined in this manner.

Still preferably, the inclination of the or each truck is about 8°.

Preferably, the forward and rear pairs of surface engaging members are spread at least about 150 mm apart.

Still preferably, an intermediate member is attached to the mounting member in a pivotal manner whereby a weight may be supported on the stabilising arrangement. In one form of the invention the intermediate member is fixed to another member by way of a resiliently biased parallelogram link.

In accordance with the present in invention there is further provided a suspension and steering arrangement for a vehicle, the suspension and steering arrangement characterised by a mounting member, at least one forward truck supporting a forward wheel pair, and at least one rear truck supporting a rear wheel pair, each truck allowing biased rotation about a central axis thereof, the forward truck being mounted on the mounting member such that it projects forwardly thereof and the rear truck being mounted on the mounting member such that it projects rearwardly thereof, the central axis of rotation of each truck being aligned with a longitudinal axis of the mounting member, the mounting member being supported substantially between the trucks and wheel pairs, whereby rotation of the mounting member about its longitudinal axis is compensated for.

Preferably, the mounting member is arranged to be pivotally connected to a means for steering the conveyance on which the suspension and steering arrangement is provided. A flexibly resilient biasing means is preferably provided within or attached to the mounting member such that the forward wheels are biased upwardly, and the rear wheels downwardly.

In one form of the present invention the flexibly resilient biasing means is provided in the form of a radial polymeric spring.

Preferably, the mounting of the trucks to the mounting member is such that the central axis of rotation of at least one of the trucks is inclined from the horizontal as defined by the mounting member. Both trucks are preferably inclined in this manner.

Still preferably, the inclination of the or each truck is about 8°.

Preferably, the forward and rear pairs of surface engaging members are spread about 150 to 300 mm apart.

The term 'truck' is to be understood to encompass any arrangement which acts to cant the wheels off the vertical, longitudinal or both axes, thereby enhancing corner and camber negotiation of the steering and suspension arrangement.

Still preferably, the trucks at least embody a centralising and shock absorbing pivot mechanism therein, either integrally or externally.

BRIEF DESCRIPTION OF THE DRAWINGS

The stabilising arrangement of the present invention will now be described, by way of example only, with reference to three embodiments in the form of a suspension and steering arrangement for a vehicle, and the accompanied drawings, in which.

BEST MODE(S) FOR CARRYING OUT THE INVENTION

Figure 1:
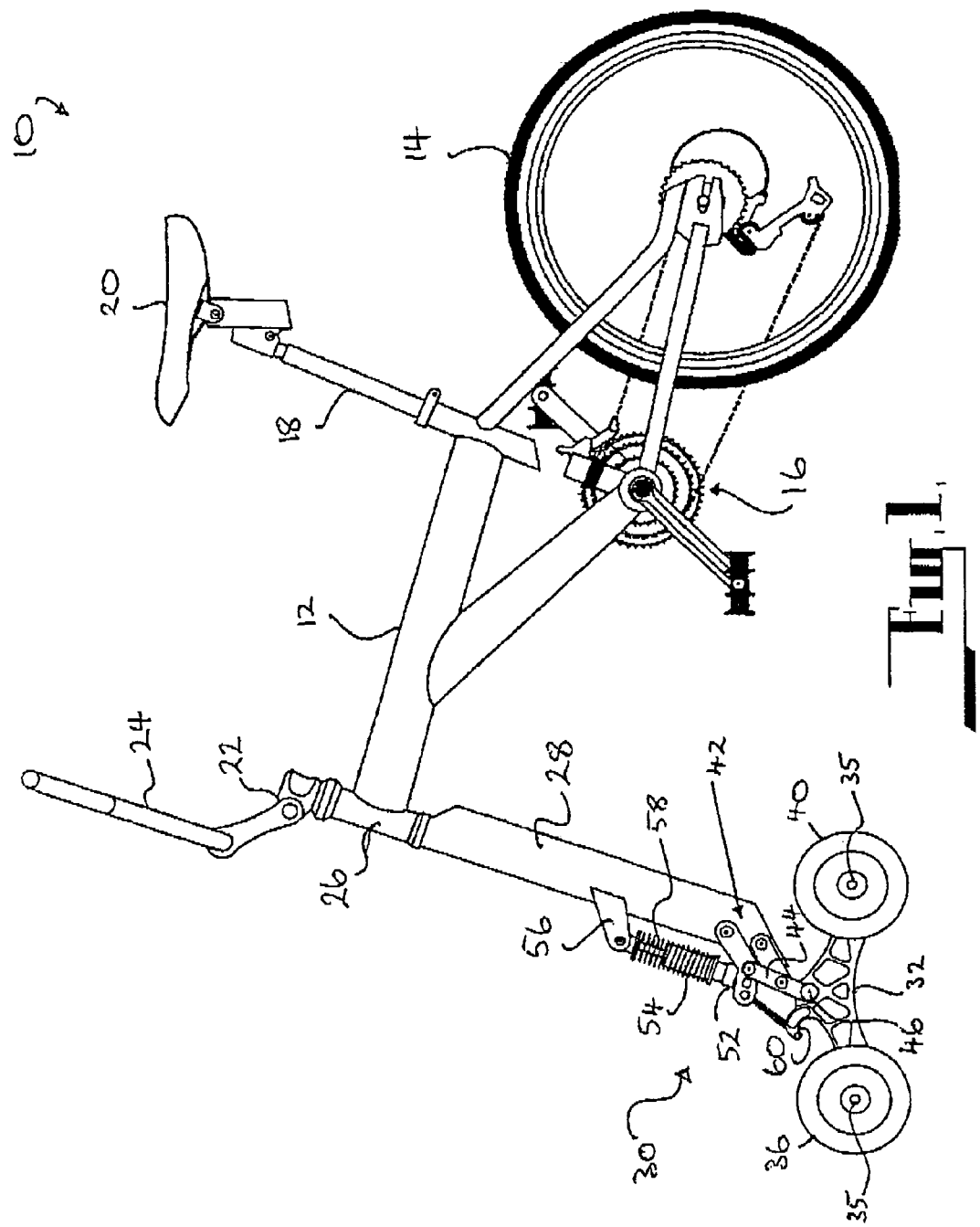
FIG. 1 is a side elevational view of a bicycle to which a suspension and steering arrangement for a vehicle, in accordance with a first embodiment of the present invention is fitted.
Figure 2:
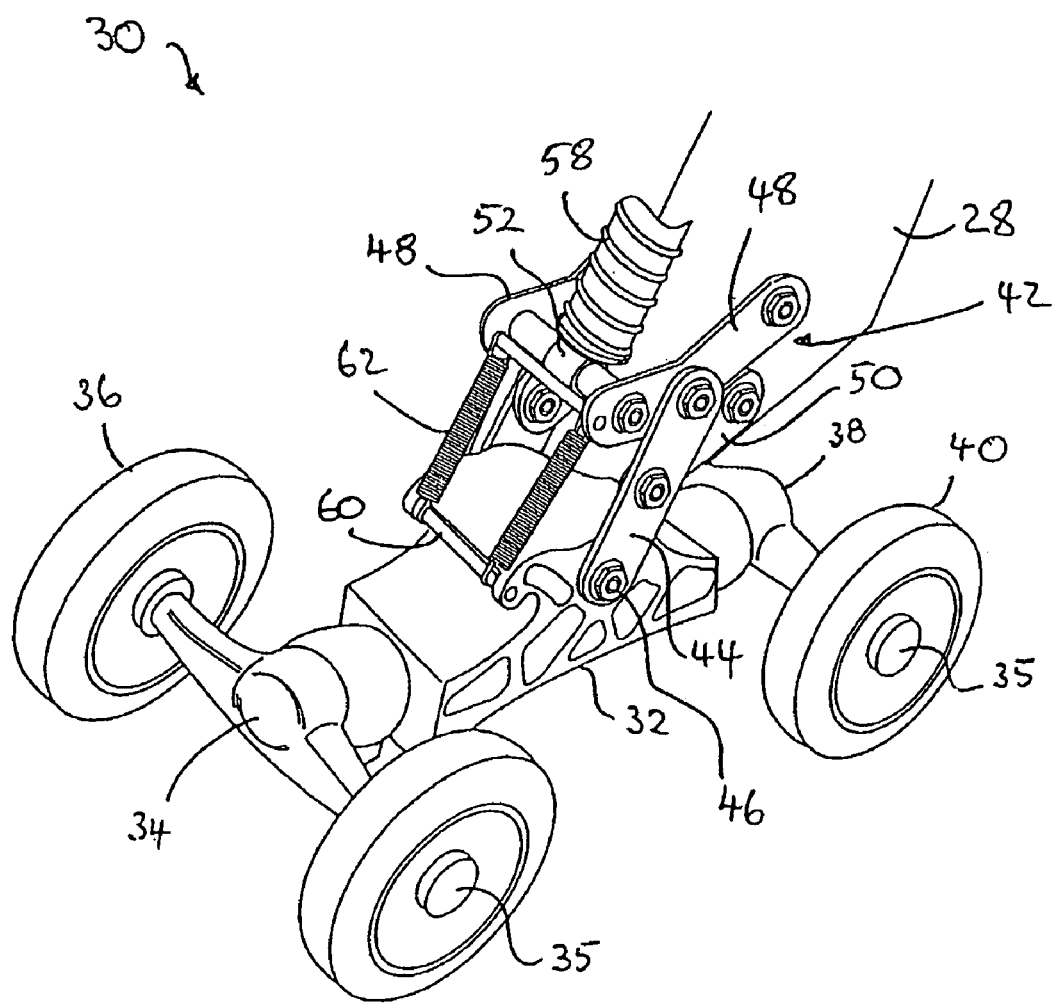
FIG. 2 is an upper perspective view of the suspension and steering arrangement of FIG. 1.
Figure 3:
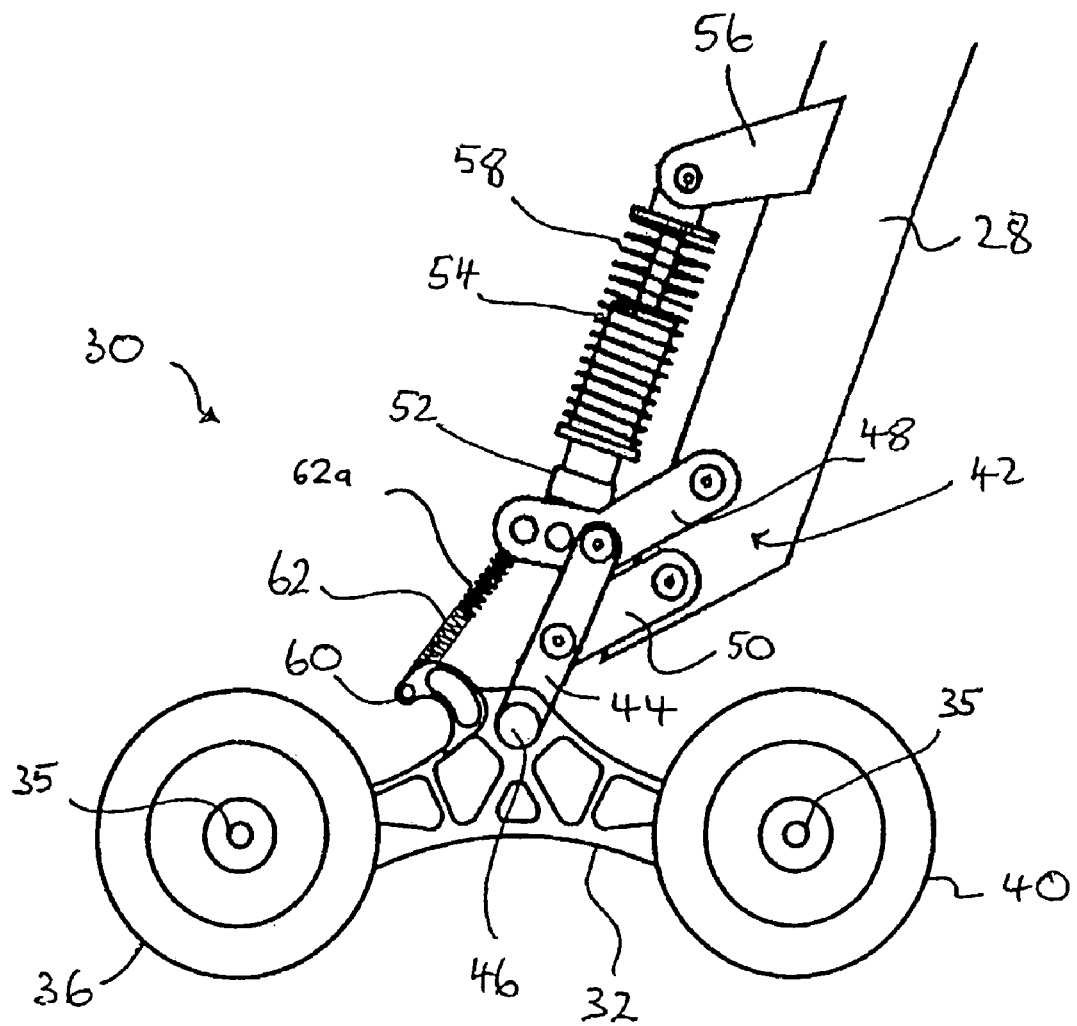
FIG. 3 is a side elevational view of the suspension and steering arrangement of FIG. 1.

In FIG. 1 there is shown a bicycle 10 comprising a frame 12, a rear wheel 14, a drive means 16 of known form, a saddle post 18, a saddle 20, a gooseneck 22 and handle bars 24. The gooseneck 22 engages the handle bars 24 and is rotatably received through a hollow neck 26 of the frame 12, in known manner.

The gooseneck 22 extends through the neck 26 of the frame 12 and engages an elongate steering member 28 which replaces the forks of known bicycles. The steering member 28 has provided thereon a stabilising arrangement, in the form of a suspension and steering arrangement 30 in accordance with a first embodiment of the present invention, and is best seen in FIGS. 2 to 6.

The suspension and steering arrangement 30 comprises a mounting member 32, a forward truck 34 supporting a forward pair of surface engaging members or wheels 36, and a rear truck 38 supporting a rear pair of surface engaging members or wheels 40.

The arrangement 30 further comprises a parallelogram link 42 and a pair of intermediate members 44. The intermediate members 44 are pivotally connected at their lower ends to the mounting member 32 at a pivot point 46.

The parallelogram link 42 comprises, on each side of the steering member 28, an upper link member 48 and a lower link member 50. Each member 48 and 50 is pivotally attached to both the steering member 28 and to one intermediate member 44. In this arrangement the intermediate members 44 may move in a parallel configuration with the steering member 28.

The upper link members 48 project forwardly of the intermediate members 44 to which they're pivotally attached and have mounted therebetween a base 52 of a piston or ram 54. The ram 54 extends upwardly therefrom and is pivotally attached to an upper mounting member 56 extending forwardly from the steering member 28. A flexibly resilient biasing means, for example a compression spring 58, is provided about the ram 54. The ram 54 and spring 58 absorb at least a portion of any shocks passed through the wheels 36 and 40, the mounting member 32, and parallelogram link 42 generally without passing these along the steering member 28.

The mounting member 32 has provided thereon an upwardly and forwardly projecting rim 60 on which flexibly resilient biasing means 62, for example a pair of springs 62a, have one end thereof located. The remaining ends of the springs 62a are attached to the upper link members 48 and act to draw the forward wheels 36 upwardly about the pivot point 46 when there is no load or weight on the arrangement 30, such as when a rider (not shown) of the bicycle 10 pulls upwardly on the handle bars 24. It is to be understood that this method of biasing the mounting member 32 is one of a number of possible methods that could be employed without departing from the scope of the present invention. For example, a compression spring or springs may be provided between the steering member 28 and a point rearward of the pivot point 46 on the mounting member 32, thereby achieving the same result.

Figure 4:
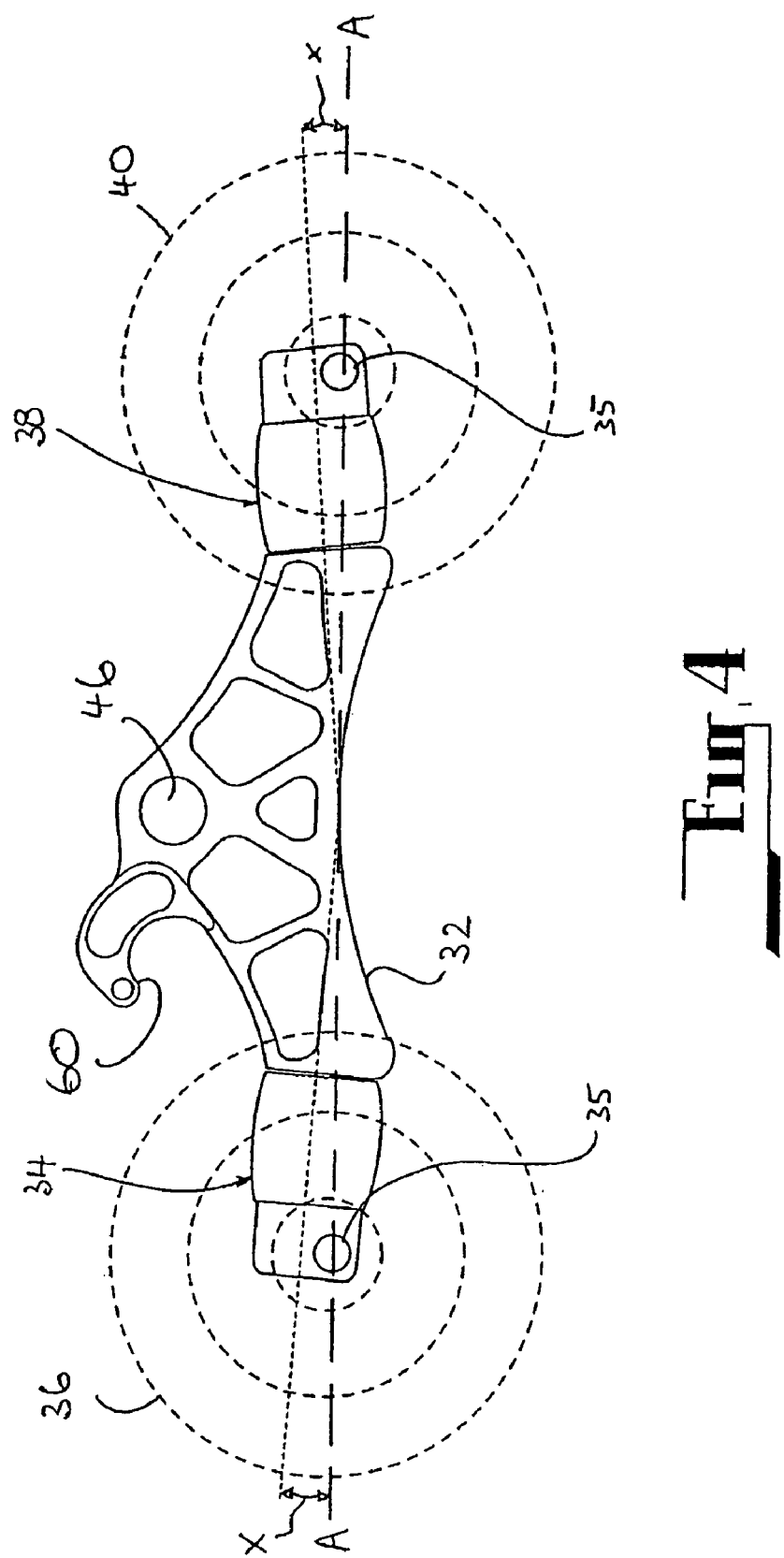
FIG. 4 is a side elevational view of only the mounting member and the trucks of the suspension and steering arrangement of FIG. 1.

In FIG. 4 the nature of the mounting of the trucks 34 and 38 to the mounting member 32 is shown. The spreading of transverse axles 35 of the wheels 36 and 40 forward and back of the mounting member 32 has the effect of enlarging the 'footprint' of the arrangement 30 relative to a 'traditional' mounting which would see the trucks 34 and 38 mounted directly under the mounting member 32.

Figure 5:
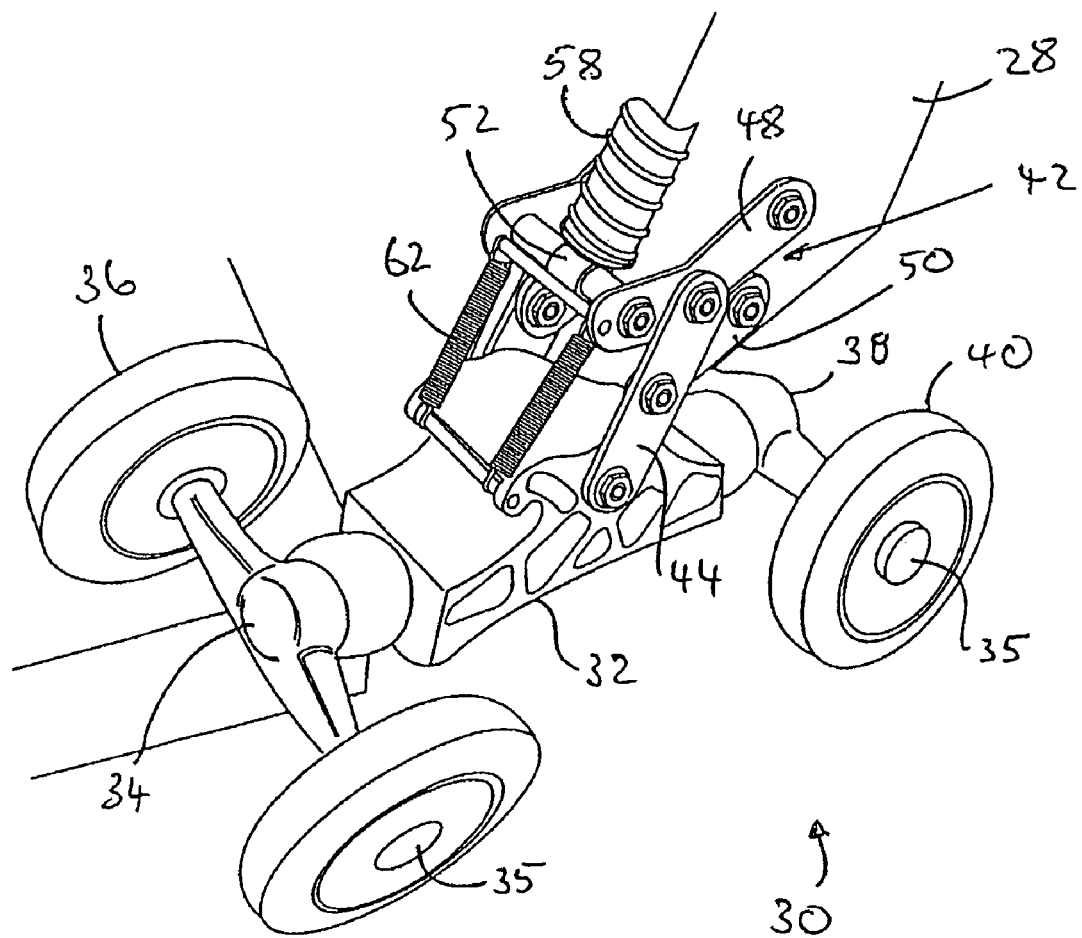
FIG. 5 is a side elevational view of the suspension and steering arrangement of FIG. 1 shown with the forward truck and wheels biased upwardly.
Figure 6:
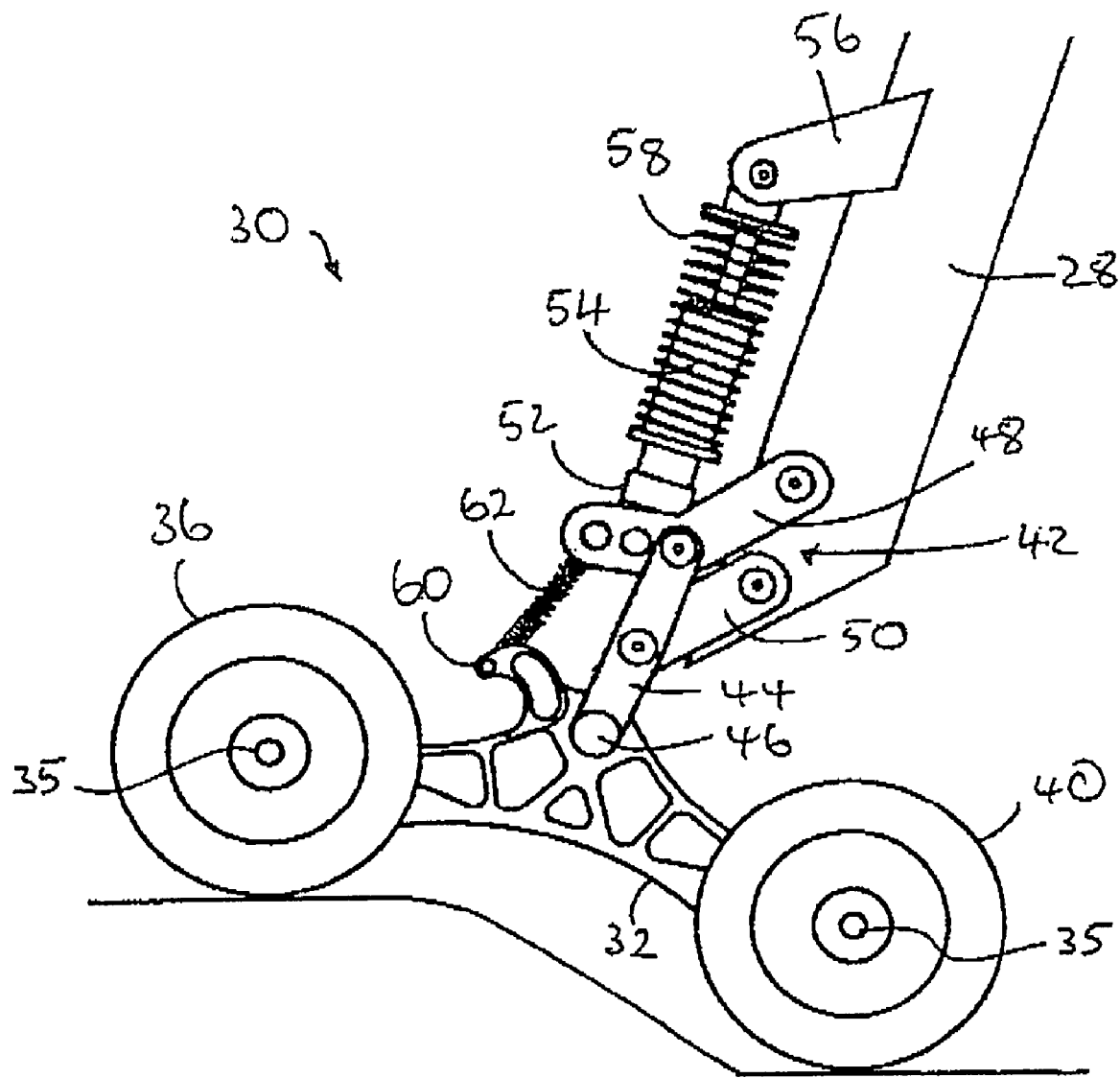
FIG. 6 is an upper perspective view of the suspension and steering arrangement of FIG. 1 shown traversing an obstacle.

The arrangement of FIG. 4 effectively accentuates the flexibility of the trucks 34 and 38. Each truck 34 and 38 allows biased rotation about its central axis, which in the arrangement 30 is aligned along a longitudinal axis of the mounting member 32 and, generally, the bicycle 10, rather than substantially vertically as is the case in the arrangement of WO 98/57839 and traditional skateboards. Further rotation is provided for about a vertical axis passing through each truck 34 and 38. This orientation of the trucks allows significant rotation of the wheel axles relative to both the longitudinal and vertical axis of each truck, thereby allowing the footprint to remain on the ground even whilst the bicycle 10 is undergoing tight turns, and even whilst traversing uneven terrain, as can be seen in FIGS. 5 and 6.

In FIG. 4 a horizontal plane is shown by line A-A, essentially defined by the transverse axles 35 and the mounting member 32. The inclination of the mounting of the trucks 34 and 38 to the mounting member 32 can be seen in this Figure. Each truck is inclined at about 8° to the horizontal, this angle being designated X. This acts to lower the pivot point 46 relative to the axles 35 of the wheels 36 and 40 and accentuates the stability of the arrangement 30 when turning, and when traversing uneven terrain. It is envisaged that the angle X may be provided reasonably up to 45°, although theoretically any angle of up to 90° should function in accordance with the invention.

The axles 35 of the wheel pairs 36 and 40 are spread about 150 mm apart, although it is envisaged that a spread of up to 300 mm would still function appropriately. However, the size of the "footprint" must be balanced against an ability to traverse bumps and the like without 'grounding' the mounting member 32.

It is preferable that the pivot point 46 be located as close to the line A-A as practical as this adds to the stability of the arrangement 30, particularly when turning.

The upper mounting member 56 and the parallelogram link 42 may be located at any point with respect to the steering member 28 and still function in accordance with the present invention. Further, the arrangement 30 may similarly be arranged as a 'trailing link' as opposed to the 'leading link' described hereinabove. In such a 'trailing link' arrangement the parallelogram link 42 projects rearwardly of the steering member 28.

Figure 7:
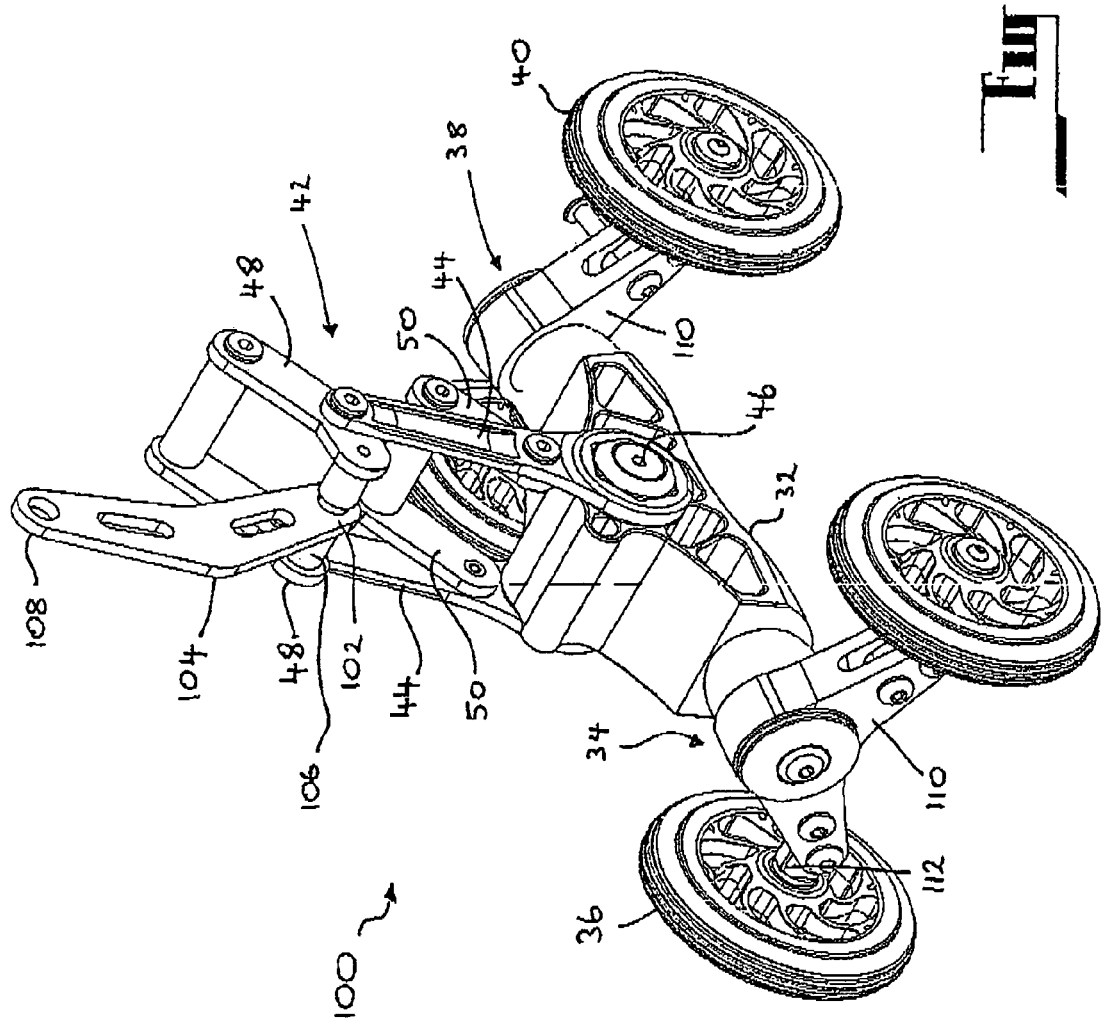
FIG. 7 is an upper perspective view of a suspension and steering arrangement in accordance with a second embodiment of the present invention, shown without the steering member to which it would be fitted in use.

In FIG. 7 there is shown a suspension and steering arrangement 100 in accordance with a second embodiment of the present invention substantially similar to the suspension and steering arrangement 30 described hereinabove and like numerals denote like parts. The steering member to which the parallelogram link 42 is attached is not shown.

A lower end 102 of an intermediate member 104 is mounted on a transverse member 106 provided between the forward projections of the upper link members 48. An upper end 108 of the intermediate member 104 is arranged to be mounted to the steering member (not shown) at a point above the level of the mounting of the parallelogram link 42. This mounting is achieved by way of a flexibly resilient biasing means, preferably in the form of a radially flexibly resilient polymeric material. Such a biasing means is distinguished by a generally annular form with an outer radial surface and an inner radial surface, the outer surface being fixed to one member and the outer radial surface fixed to another, whereby the rotation of the inner surface relative to the outer surface is flexibly and resiliently biased.

The pivot point 46 between the intermediate members 44 and the mounting member 32 is provided with a radially flexible resilient biasing means such that the forward wheel pair 36 are biased upwardly, as in the embodiment of FIGS. 1 to 6, without the need for the pair of springs 62 or similar.

Further, the typical biasing means of the trucks 34 and 38 are replaced with a radially flexible resilient biasing means, as described hereinabove, and located about the longitudinal rotational axis of each truck 34 and 38. Each truck 34 and 38 is provided with an intermediate transverse member 110 that engages the outer surface of the biasing means and to which a stub axle 112 from each wheel is attached. The inner surface of the biasing means is attached to a member defining the central axis of the truck.

Figure 8:
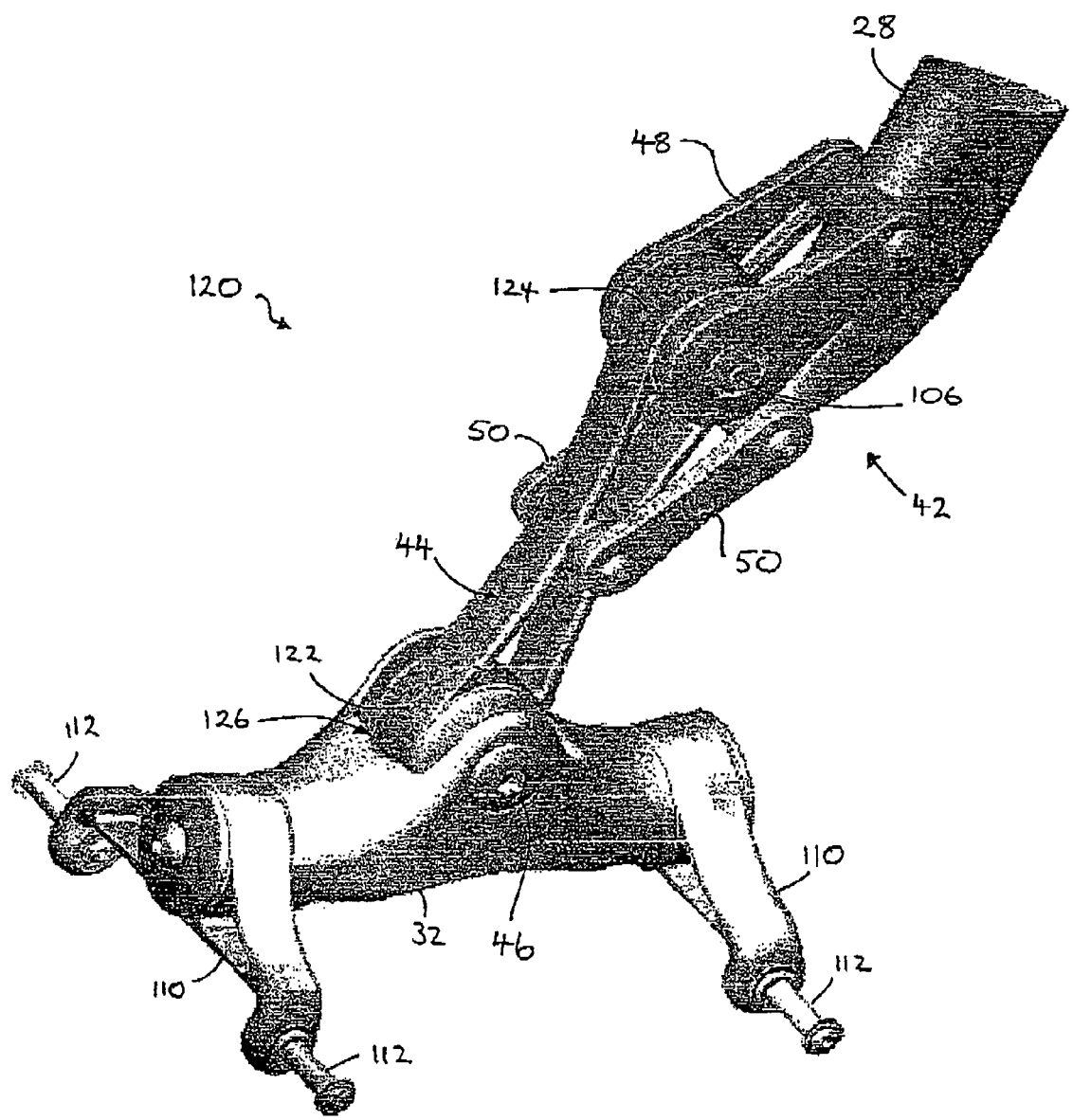
FIG. 8 is a forward upper perspective view of a suspension and steering arrangement in accordance with a third embodiment of the present invention, shown without wheels provided thereon, the steering member being shown only in part.
Figure 9:
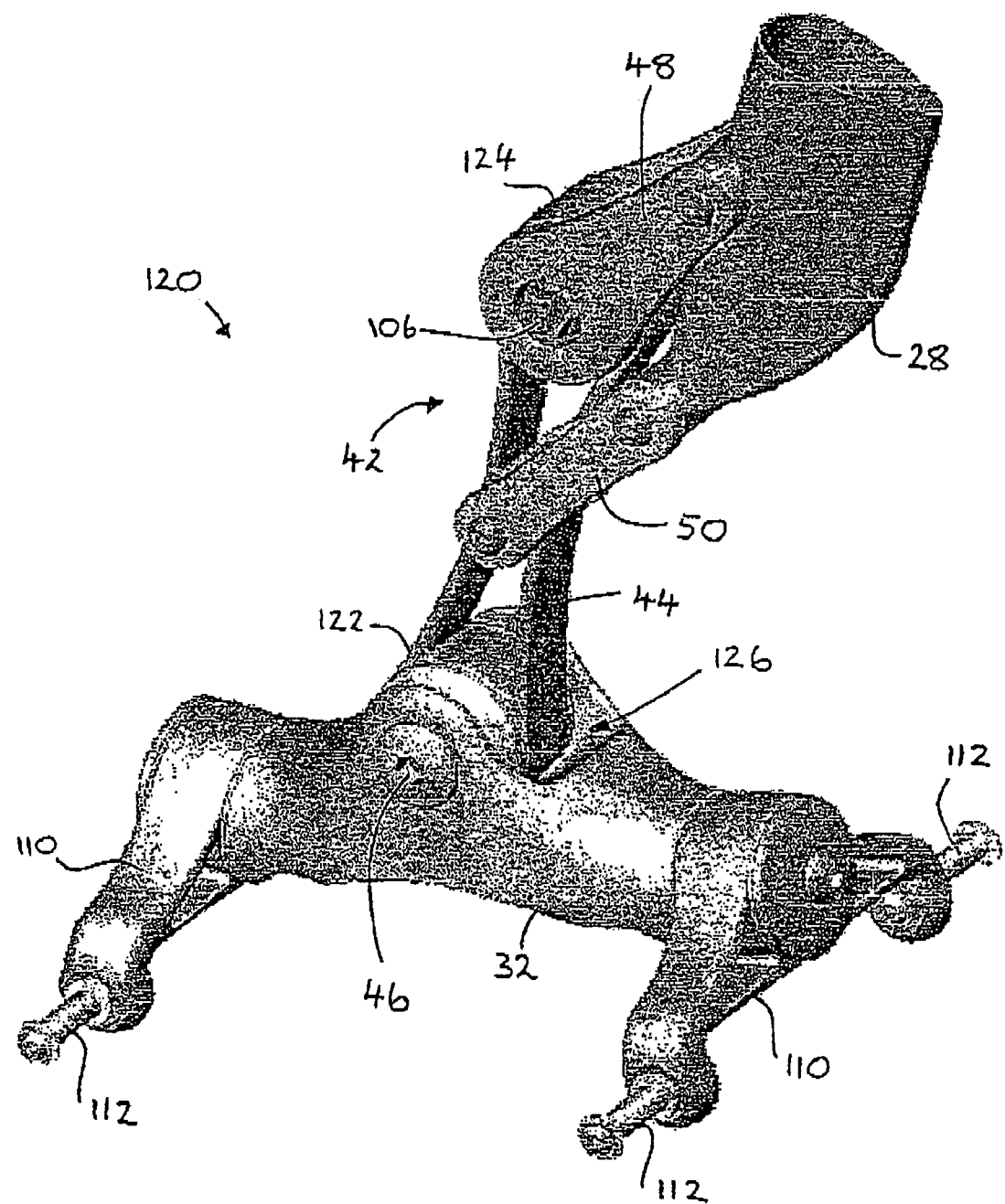
FIG. 9 is a rear upper perspective view of the suspension and steering arrangement of FIG. 8.
Figure 10:
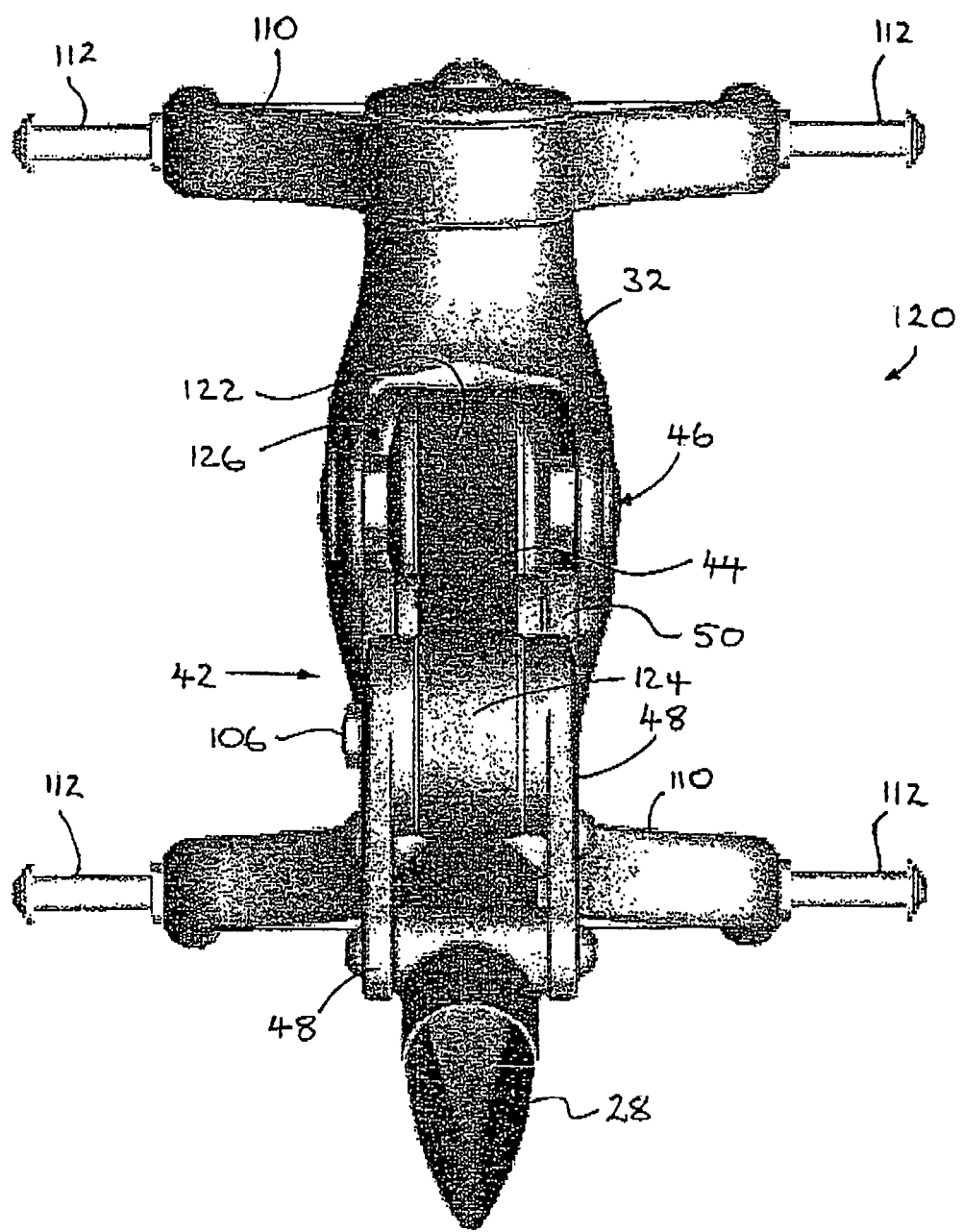
FIG. 10 is an upper plan view of the suspension and steering arrangement of FIG. 8.

In FIGS. 8 to 10 there is shown a suspension and steering arrangement 120 in accordance with a third embodiment of the present invention substantially similar to the suspension and steering arrangement 100 described hereinabove and like numerals denote like parts. The steering member to which the parallelogram link 42 is attached is again not shown.

A single intermediate member 44 is provided having a radially flexible resilient biasing means held within a lower end 122 and a further radially flexible resilient biasing means held within an upper end 124 thereof. The lower end 122 is received within a recess 126 in the mounting member 32. A pivot member extends transversely through the recess and engages an inner surface of the biasing means thereby providing the pivot point 46 between the intermediate member 44 and the mounting member 32.

The upper link members 48 again have a transverse member 106 provided between their forward ends. However, a radial biasing means is provided about the transverse member 106, the inner surface thereof. In engagement therewith. The outer surface thereof being in engagement in the upper end 124 of the intermediate member 44. In such a manner the shock absorbing characteristics of the ram 54 and spring 58 of the arrangement 30 are achieved without the need for another remote mounting to the steering member 28 as provided by the upper mounting member 56. Similarly, the intermediate member 104 of the arrangement 100 is not required.

It is envisaged by the inventor that the parallelogram link 42 may be replaced by its functional equivalent without departing from the spirit and scope of the present invention.

It is further envisaged that an arrangement in accordance with the present invention may be utilised as a surface engaging element for the stabilising arrangements employed, for example, on heavy machinery and equipment. Such applications will include cranes and digging equipment employing rams with surface engaging elements on the lower ends thereof. The wheels of the arrangements 30, 100 and 120 described hereinabove may be replaced with other more suitable surface engaging means.

In such applications the same features that provide the surface holding ability of the arrangements 30, 100 and 120 provide the arrangement with an ability to adapt to the configuration of a surface, be it undulating or loose, in a stable manner. It is envisaged that the intermediate member 44 may be attached to the piston member of a ram in the same manner as it is described above as being attached to the steering member 28. Alternatively, the ram may be attached to the mounting member 32 directly.

It is still further envisaged that the surface engaging element applications of the arrangement of the present invention go beyond stabilising heavy equipment and may find application in other circumstances requiring a stable ground engaging element.

The stabilising arrangements 30, 100 and 120 described hereinabove are to be understood to be an illustration of principle only. The same or similar functions may be achieved through the use of linkages, mechanisms or transposed elements of the spirit and nature of those of the embodiment described, in one or more arrangements or combinations thereof in any area or location within or on a vehicle. As such, modifications and variations such as would be apparent to the skilled addressee are considered to fall within the scope of the present invention.

The invention claimed is:

1. A stabilising arrangement comprising:
   a mounting member,
   at least one forward truck supporting a forward pair of surface engaging members, and
   at least one rear truck supporting a rear pair of surface engaging members,
   each truck being biasedly rotatable about a central axis thereof with respect to the mounting member, the forward truck being mounted on the mounting member such that it extends forwardly therefrom and the rear truck being mounted on the mounting member such that it extends rearwardly therefrom, the mounting member being supported substantially between the trucks and pairs of surface engaging members, whereby rotation of the mounting member with respect to its longitudinal axis is accommodated by relative movement of each truck about the central axis,
   wherein a steering member is connected to the mounting member for turning the mounting member about an axis substantially perpendicular to a surface engaged by the surface engaging members.

2. A stabilising arrangement according to claim 1, wherein the mounting of the trucks to the mounting member is such that the central axis of rotation of at least one of the trucks is inclined from the horizontal as defined by the mounting member.

3. A stabilising arrangement according to claim 2, wherein both trucks are inclined in this manner.

4. A stabilising arrangement according to claim 2, wherein the inclination of the or each truck is about 8°.

5. A stabilising arrangement according to claim 1, wherein the forward and rear pairs of surface engaging members are spread at least about 150 mm apart.

6. A stabilising arrangement according to claim 1, wherein an intermediate member is attached to the mounting member in a pivotal manner whereby a force acting toward the stabilising arrangement is supported thereby.

7. A stabilising arrangement according to claim 6, wherein the intermediate member is also fixed to another member by way of a resiliently biased parallelogram link.

8. A suspension and steering arrangement according to claim 1, wherein the steering member is further adapted to rotate the mounting member about its longitudinal axis.

9. A suspension and steering arrangement for a vehicle, the suspension and steering arrangement comprising:
   a mounting member,
   at least one forward truck supporting a forward wheel pair, and
   at least one rear truck supporting a rear wheel pair,
   each truck being biasedly rotatable about a central axis thereof with respect to the mounting member, the forward truck being mounted on the mounting member such that it extends forwardly therefrom and the rear truck being mounted on the mounting member such that it extends rearwardly therefrom, the mounting member being supported substantially between the trucks and wheel pairs, whereby rotation of the mounting member with respect to its longitudinal axis is accommodated by relative movement of each truck about the central axis,
   wherein a steering member is connected to the mounting member for turning the mounting member about an axis substantially perpendicular to a surface engaged by the surface engaging members.

10. A suspension and steering arrangement according to claim 9, wherein the mounting member is arranged to be pivotally connected to a means for steering a conveyance on which the suspension and steering arrangement is provided.

11. A suspension and steering arrangement according to claim 9, wherein a flexibly resilient biasing means is provided such that the forward wheels are biased upwardly, and the rear wheels downwardly.

12. A suspension and steering arrangement according to claim 11, wherein the flexibly resilient biasing means is provided in the form of a spring made of a polymeric material.

13. A suspension and steering arrangement according to claim 9, wherein the mounting of the trucks to the mounting member is such that the central axis of rotation of at least one of the trucks is inclined from the horizontal as defined by the mounting member.

14. A suspension and steering arrangement according to claim 9, wherein the steering member is further adapted to rotate the mounting member abouts its longitudinal axis.

* * * * *